United States Patent
Guthrie et al.

(10) Patent No.: US 6,493,779 B1
(45) Date of Patent: Dec. 10, 2002

(54) METHOD AND SYSTEM FOR INTERRUPT HANDLING USING DEVICE PIPELINED PACKET TRANSFERS

(75) Inventors: Guy Lynn Guthrie, Austin, TX (US); Richard Allen Kelley, Apex, NC (US); Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,111

(22) Filed: Dec. 21, 1998

(51) Int. Cl.[7] ................................................ G06F 13/24
(52) U.S. Cl. ...................... 710/260; 710/263; 710/264; 710/48; 710/260
(58) Field of Search ................................ 710/263, 117, 710/268, 116, 113, 48, 264, 260; 709/207, 229

(56) References Cited

U.S. PATENT DOCUMENTS

| | | | | |
|---|---|---|---|---|
| 4,979,100 A | * | 12/1990 | Makris ........................ 364/200 |
| 5,146,597 A | * | 9/1992 | Williams ..................... 395/725 |
| 5,282,272 A | * | 1/1994 | Guy ............................ 395/275 |
| 5,428,794 A | * | 6/1995 | Williams ..................... 395/725 |
| 5,481,724 A | * | 1/1996 | Heimsoth .................... 395/200 |
| 5,689,713 A | * | 11/1997 | Normoyle ................... 295/736 |
| 6,052,368 A | | 4/2000 | G unes Aybay |
| 6,192,439 B1 | * | 2/2001 | Grunewald et al. ......... 710/260 |
| 6,240,474 B1 | * | 5/2001 | Guthrie et al. .............. 710/105 |
| 6,263,397 B1 | * | 7/2001 | Wu et al. .................... 710/268 |
| 6,418,497 B1 | * | 7/2002 | Guthrie et al. .............. 710/264 |

\* cited by examiner

Primary Examiner—Peter Wong
Assistant Examiner—Benjamin Ortiz
(74) Attorney, Agent, or Firm—Leslie A. Van Leeuwen; Bracewell & Patterson, L.L.P.

(57) ABSTRACT

A method and apparatus is provided in which Pipelined Packet Transfers (PPT) are implemented. The PPT methodology includes a request phase and a response phase. The PPT request phase involves a PPT request master delivering to a PPT request target a source address, a destination address and an information packet for the interrupt being requested. The PPT response phase involves the PPT request target becoming a PPT response master with the PPT response master delivering to a PPT request master a destination address and a data packet which includes the interrupt processing information. Pipelined Packet transfers (PPT) are ordered in accordance with a predetermined processing priority to improve performance and avoid deadlock.

20 Claims, 5 Drawing Sheets

METHOD AND SYSTEM FOR INTERRUPT HANDLING USING DEVICE PIPELINED PACKET TRANSFERS

RELATED APPLICATIONS

The present application is related to a co-pending application entitled "METHOD AND SYSTEM FOR INTERRUPT HANDLING USING SYSTEM PIPELINED READ TRANSFERS", application Ser. No. 09/224,119 filed on even date herewith now U.S. Pat. No. 6,418,497 and "PIPELINED READ TRANSFERS", application Ser. No. 08/931,705 previously filed now U.S. Pat. No. 6,240,474 both applications assigned to the assignee of the present application.

BACKGROUND OF THE INVENTION

1. Technical Field

The present invention relates generally to information processing systems and more particularly to an improved information transfer methodology in a computer-related environment. Still more particularly, the present invention relates to a method and system for input/output device read transfers that utilize a request phase and a response phase in association with the systems interrupt controller.

2. Description of the Related Art

As computer systems and networked computer systems proliferate, and become integrated into more and more information processing systems which are vital to businesses and industries, there is an increasing need for faster information processing and increased data handling capacity. Even with the relatively rapid state-of-the-art advances in processor technology, and the resulting increased processor speeds, a need still exists for faster processors and increased system speeds and more efficient information processing methodologies. This need is at least partially due to a growing number of computer applications and capabilities, including extensive network and rich graphics and display applications among others. As new applications for computers are implemented, new programs are developed and those programs are enriched with new capabilities almost on a daily basis. While such rapid development is highly desirable, there is a capability cost in terms of system speed.

One of the problems that have been difficult to solve with the rapid growth of computer data or information-processing systems is the complexity of interrupts from I/O devices. There are a number of problems that need to be solved simultaneously relative to interrupts, more specifically, scalability, data coherency, latency and how to connect far removed remote input/output devices. In terms of scalability, the problem is in how to scale from a small number of devices to a large number without incurring larger than necessary costs at the low end or limiting the number of interrupting devices at the high end. The problem encountered in data coherency is how to assure that the interrupt is not serviced by the system before the data is at its destination. In today's computer systems, the I/O device transfers the data through host bridges and the like and signals that the operation is complete through a separate path. If this separate path is faster the path that the data takes, then the interrupt could be serviced before the data is at the destination, and wrong data could be accessed.

The problem inherent in latency is how to reduce the service time and overhead of a device interrupt. If the latency to access the I/O device to gather status or reset interrupts is large, then the interrupt service time is extended, affecting the amount of useful work that the system can perform. Lastly, with respect to remote input/output (I/O) devices, a problem exists is how to interconnect the interrupts from I/O devices that may be located across cables or fiber optic links (a very real possibility because all the I/O in large systems may not fit inside a relatively small box). Running separate wires from each I/O device to some centrally located interrupt controller may not be feasible.

In the past, there have been a number of attempts to solve some of these problems individually. Therefore, there is a need for an improved information processing methodology and system in which information is more efficiently transferred between master and target devices during information processing transactions and which offers a global solution to all the problems stated above. This invention solves these problems in a novel and unique manner that has not been part of the art previously.

SUMMARY OF THE INVENTION

It is therefore one object of the present invention to provide a method and system for scaling from a small number of devices to a large number without incurring larger than necessary costs at the low end or limiting the number of interrupting devices at the high end.

It is another object of the present invention to provide a method and system in which information is more efficiently transferred by increasing data coherency and reducing latency between master and target devices during information processing transactions.

It is still yet another object of the present invention to provide a method and system in which interrupts can be may be transferred from a remotely attached I/O device.

The foregoing objects are achieved as is now described. A method and apparatus is provided in which Pipelined Packet Transfers (PPT) are implemented. The PPT methodology includes a request phase and a response phase. The PPT request phase involves a PPT request master delivering to a PPT request target a source address, a destination address and an information packet for the interrupt being requested. The PPT response phase involves the PPT request target becoming a PPT response master with the PPT response master delivering to a PPT request master a destination address and a data packet which includes the interrupt processing information. Pipelined Packet transfers (PPT) are ordered in with a predetermined processing priority to improve performance and avoid deadlock.

All objects, features, and advantages of the present invention will become apparent in the following detailed written description.

BRIEF DESCRIPTION OF THE DRAWINGS

A better understanding of the present invention can be obtained when the following detailed description of a preferred embodiment is considered in conjunction with the following drawings, in which.

DESCRIPTION OF THE PREFERRED EMBODIMENTS

Figure 1:
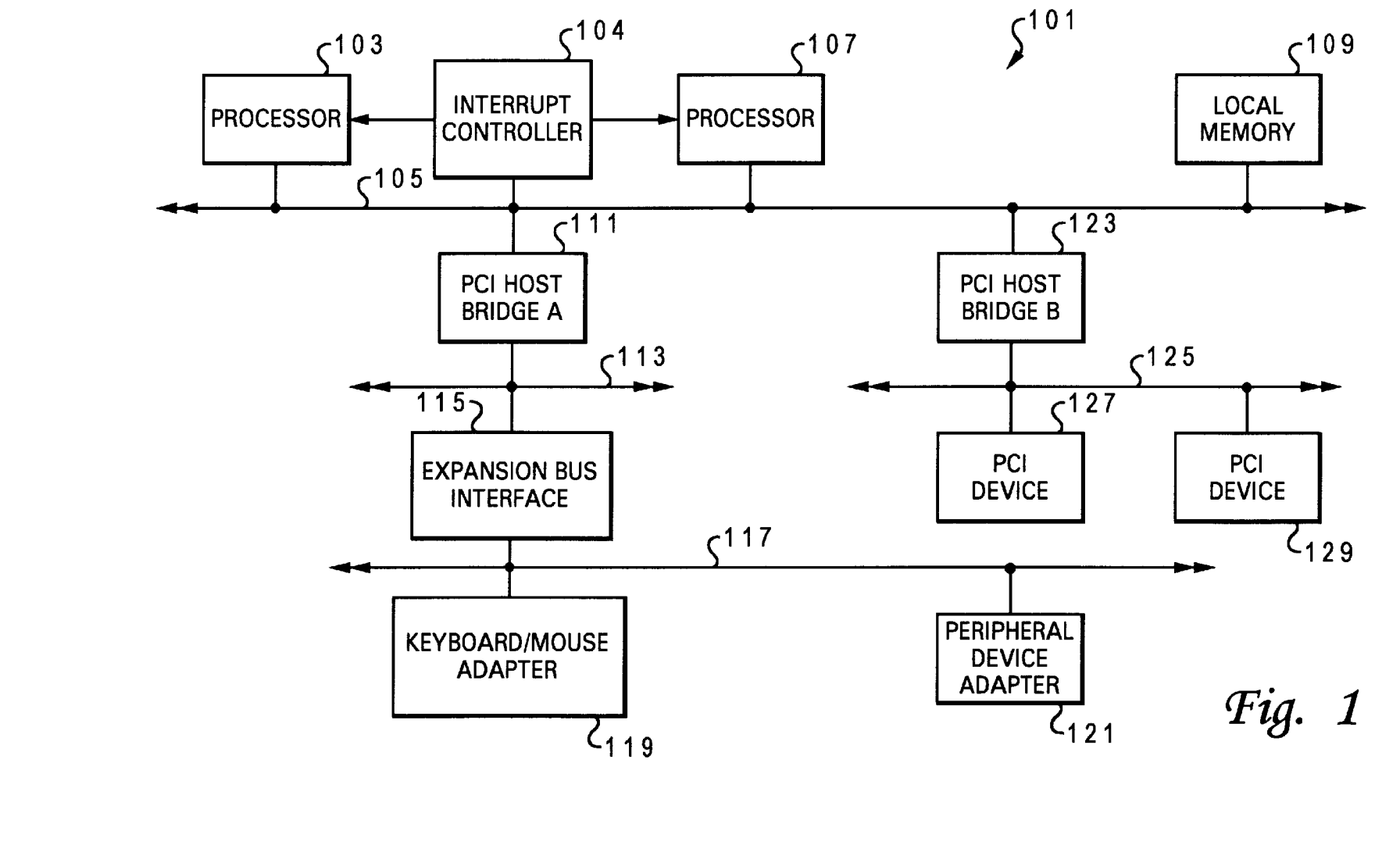
FIG. 1 is a block diagram of a typical computer related information processing system in which an exemplary embodiment of the present invention may be implemented.

With reference to FIG. 1, the various methods discussed herein may be implemented within a typical computer system 101 that may include one or more computers or workstations in various combinations. An exemplary hardware configuration of a computer system which may be used in conjunction with the present invention is illustrated and includes a processor device 103, such as a conventional microprocessor, and a number of other units interconnected through a system bus 105, which may be any host system bus. The system bus may have one or more additional processors connected to the bus such as processor 107. It is noted that the processing methodology disclosed herein will apply to many different bus and/or network configurations. The bus 105, as well as any of the other busses illustrated, may be extended as shown to include further connections to other computer systems, workstations or networks, and other peripherals and the like. The computer system shown in FIG. 1 includes a local memory 109 and an interrupt controller 104 for use with one aspect of the present invention.

The system bus 105 is connected through a PCI (Peripheral Component Interconnect) Host Bridge A circuit 111 to a second bus 113, which, in turn, is connected through an expansion bus interface 115 to an expansion bus 117 in the present example. The expansion bus 117 may include connections to a keyboard/mouse adapter 119 and also to other peripheral device adapters such as peripheral device adapter 121. The system bus 105 may also be connected through additional bridge circuits such as PCI Host Bridge B 123, to a corresponding PCI bus 125 to which additional PCI devices 127 and 129 are connected.

In general, throughout this disclosure, the following conventions and terminology are used. The term "PPT" refers to a pipeline packet transfer. The term "PPT request master" is used to refer to a PCI bus master or system bus master issuing a PPT request command. A "PPT request target" refers to a PCI bus target or system bus target responding to a PPT request command. A "PPT response master" refers to a PCI bus master or system bus master returning PPT response data and a "PPT response target" refers to a PCI bus target or system bus target device accepting PPT response data. A PCI or system bus device is a PPT request master when it issues a PPT request. A PCI or system bus device is a PPT response target when data is returned by a PPT response master. A PPT request master device typically becomes the PPT response target for the PPT requests that it issues, but it is not required. The PPT response target could be a third device. A PCI device is a PPT request target when it receives a PPT request and a PCI device becomes a PPT response master when it is able to return the PPT requested data.

A bridge that supports the PPT command will forward PPT requests and PPT responses between its primary and secondary busses. For example a bridge that receives a PPT request as a PPT request target on a primary bus will forward the PPT request on to the secondary bus by becoming a PPT request master on the second bus. Similarly, a bridge that receives a PPT response as a PPT response target on a primary bus will forward the PPT response onto the secondary bus by becoming a PPT response master on the secondary bus.

Figure 2:
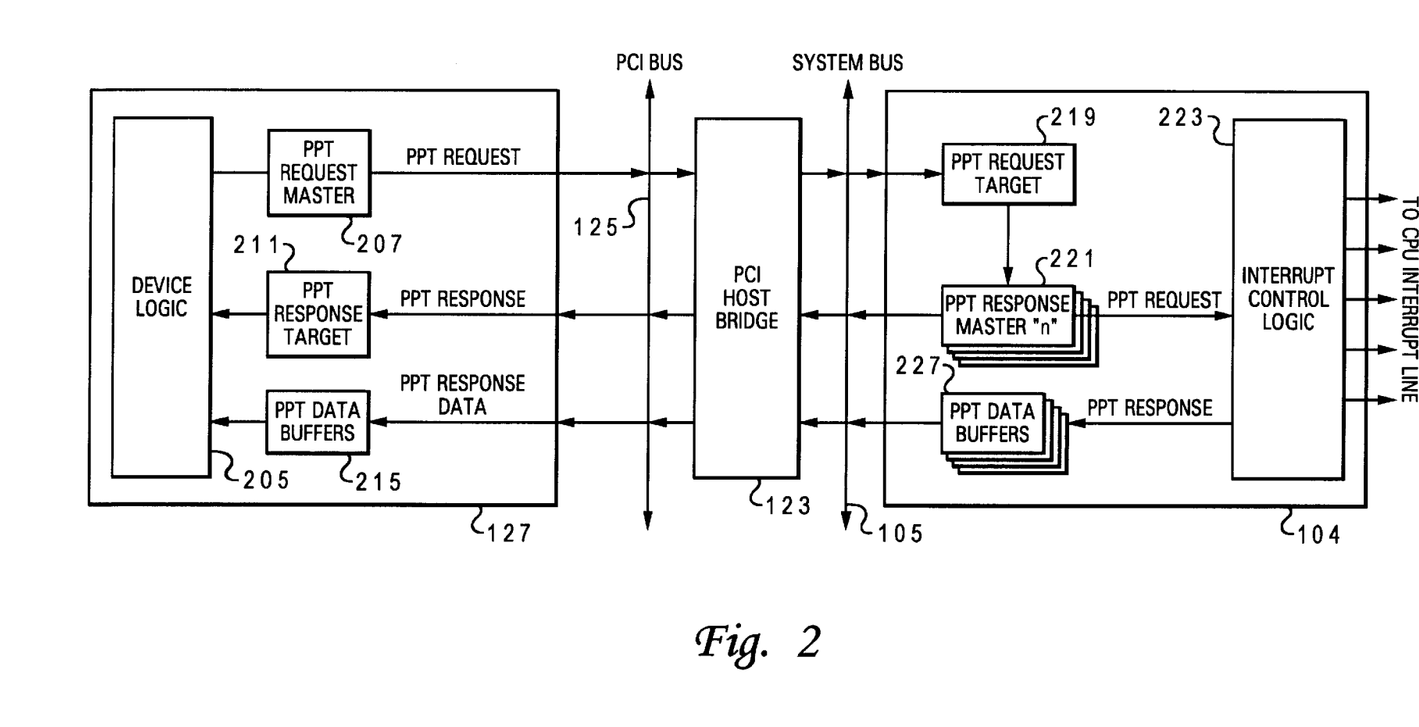
FIG. 2 is a block diagram of an exemplary pipelined read transfer (PPT) master-target configuration.

FIG. 2, there is shown an exemplary implementation within which a Pipeline Packet Transfer (hereinafter referred to as "PPT") operation may be accomplished. Generally, PPT capable devices will use a general two-phase command, namely a request phase and a response phase, utilizing PPT master logic and PPT target logic. In accordance with the present invention, the request phase of the PPT command transmits interrupts from an I/O device 127 to the interrupt controller 104 and will use the response phase to receive interrupt completion or rejection status. Referring once again to FIG. 2, a PCI 127 device is shown having device logic 205 which applies a PPT request signal through a PPT request master 207 onto the PCI bus 125 for delivery into the PCI host bridge 123. The PCI host bridge 123 delivers the PPT request signal to a PPT request target 219 in the interrupt controller 104 via the system bus 105.

Figure 3:
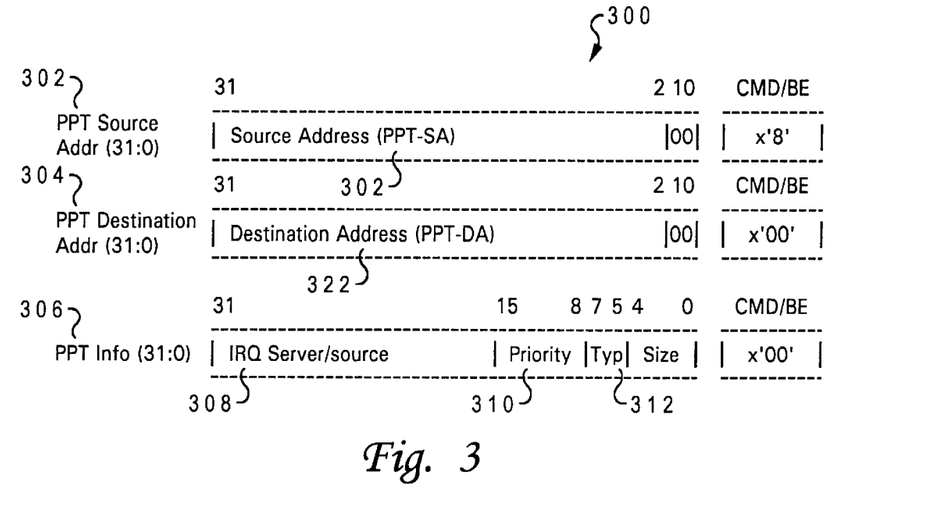
FIG. 3 is depicts a digital format for a PPT request in accordance with the present invention.

Referring now to FIG. 3, there is shown a PPT request 300 format that is issued by the PPT request master 207 when it wants access to a PPT request target 219. The PPT Request 300 contains three fields: a source address 302, a destination address 304, and an information packet 306. This format is a more generalized format than that used in applicant's previously filed application, "PIPELINED READ TRANSFERS", Attorney Docket AT9-97-261. The Source Address 302 (PPT-SA) is a 4 byte PCI address which the PPT request target 219 uses to determine where in the interrupt controller 104 to write the interrupt. This address would be setup by the system configuration time into each I/O device's configuration registers. The destination address (PPT-DA) 304 is a 4 byte PCI address which the PPT request 219 uses when returning the interrupt status. The I/O device 127 sets this to an address where the interrupt response should be placed. The IRQ service/source 308 in the PPT information packet 306, is defined as a 16-bit field, which specifies to the interrupt service routine which device driver to call to service the interrupt and to the device to indicate what is the source of the interrupt in the I/O device. The number of bits used for IRQ server and the number for IRQ source is operating system dependent.

Referring once again to both FIGS. 2 and 3, the priority field 310 is the priority of the interrupt. This is used by the interrupt controller 104 to determine whether or not to queue the interrupt or to return it to the I/O device 127. The priority would be setup by the system configuration code at configuration time into each I/O device's configuration registers, or would be setup by the operating system. The type field 312 determines the PPT packet type. The field is defined as a 3-bit field. As shown in FIG. 2, the PPT request target 219 inputs the PPT request 300 to one of a plurality of PPT response master "n" circuits 221. The PPT response master circuits 221 are arranged to apply request information to the interrupt control logic 223. If the interrupt control logic 223 accepts the request, the request 300 is forwarded to the appropriate CPU for action as shown in FIG. 2. The interrupt controller 104 then receives the appropriate response from the CPU to the PPT response master 221 for delivery to the PCI device 127 via the system bus 105. A group of PPT data buffers 227 are also arranged to receive PPT response data from the interrupt control logic 223 and provide an input to the PCI device 127 via system bus 105, PCI host bridge 123 and PCI bus 125.

Figure 4:
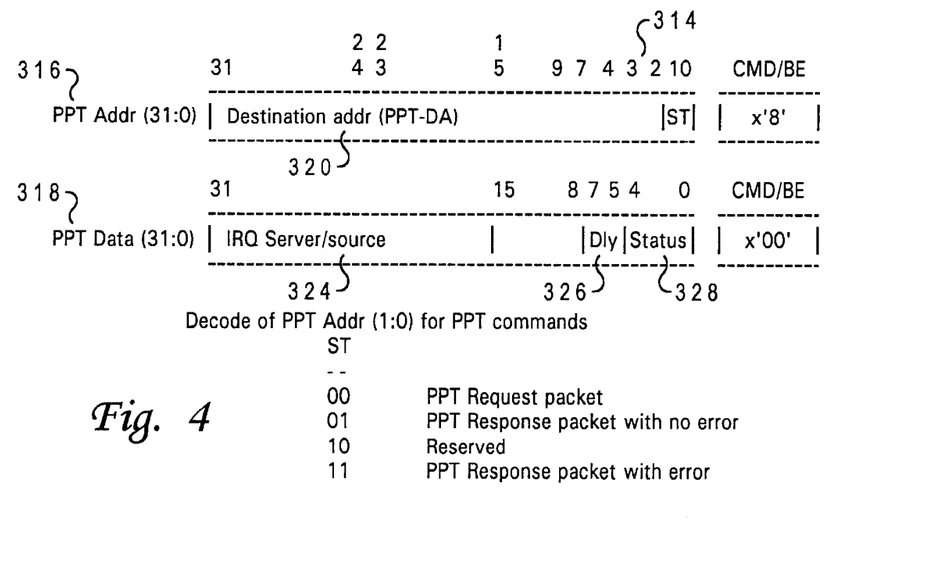
FIG. 4 is depicts a digital format for a PPT request in accordance with the present invention.

Referring once again to both FIGS. 3 and 4, the format for the PPT response packet 314 is as follows: the value of the destination address field 320 is the same as for the same field in the PPT master request 322. For PPT packets of type 0b001, there will only be 4 bytes of data. The data fields are defined as follows: the IRQ server/source 324 is the same as delivered to the interrupt controller 104. This maybe used by the I/O device 127 to match up the status with the source of the interrupt (devices with one or few interrupts may not need to do this, or may optionally use the destination address to define the source. The status field 328 is defined as follows: 0b00001 is interrupt accepted, 0b00010 is interrupt rejected, and 0b00100 is interrupt servicing complete. Note that the I/O device 127 needs to be prepared to receive an interrupt rejection following an interrupt accept, up until the time when the interrupt complete is received. That is so the interrupt controller 104 can bump an interrupt from its queue if it needs room for a higher priority interrupt (this is the key to the scalability of this structures).

Referring once again to FIG. 4, the delay field 326 is used to give a hint to the I/O device 127 as to how long it should wait between getting an interrupt rejection and the representation of that interrupt. The value is in microseconds, with 0b0000 meaning that the I/O device 127 needs immediate servicing, it may ignore the delay field for that occurrence of that interrupt. As an alternate implementation to the delay-and-represent implementation, the system may be implemented to allow the interrupt controller to broadcast a "represent any interrupts now" command on the buses. In the PCT environment, that would need to be presented as a PCI Special Cycle command. Note that those skilled in the art will recognize that the bit fields defined above could be defined with different size or locations and still have significantly the same invention.

The PPT request packet is distinguished from prior art Pipeline Response Target PRT (described in applicants previously filed application "Pipelined Read Transfers") by the type field 312. For the PRT, this field was designated as "Reserved" and therefore as is common in the state of the art, would have a value of 0b000. For the PPT command, the type field would be non-zero and for the PPT used for transferring interrupts, the type field would be 0b001. The PPT request target will use the destination address received in the PPT request packet as the initial destination address in the PPT response packet.

Figure 5:
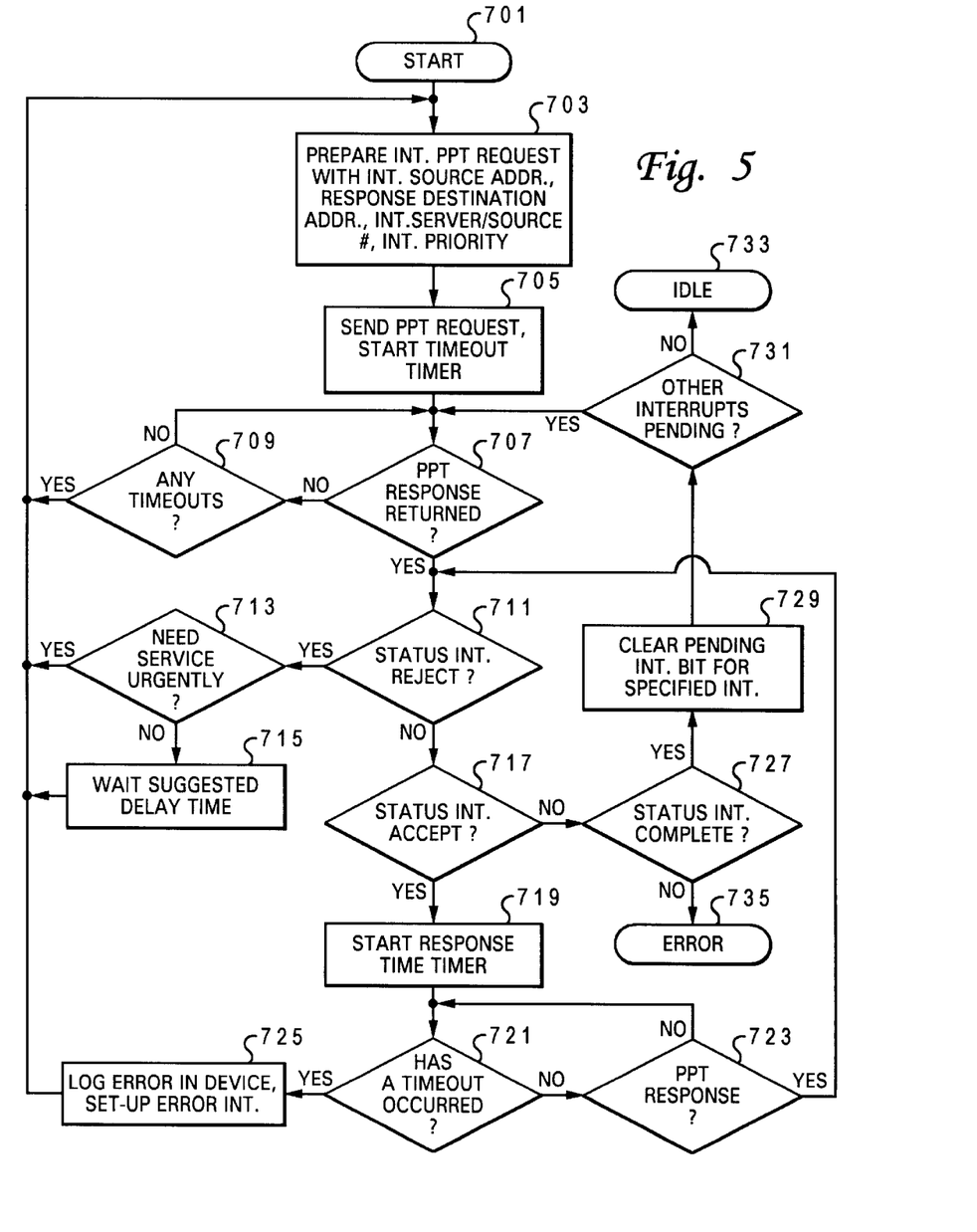
FIG. 5 is a flow chart illustrating a functional flow for a PPT request master processing an interrupt.
Figure 6:
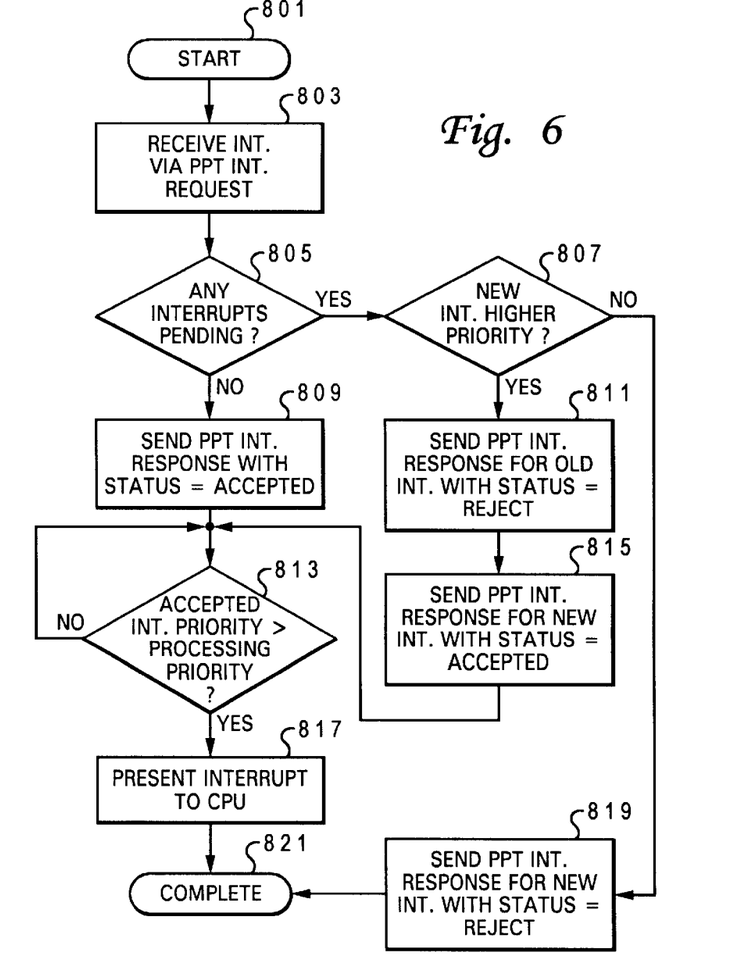
FIG. 6 is a flow chart illustrating a functional flow for a PPT request target processing interrupts received from a PPT request master.
Figure 7:
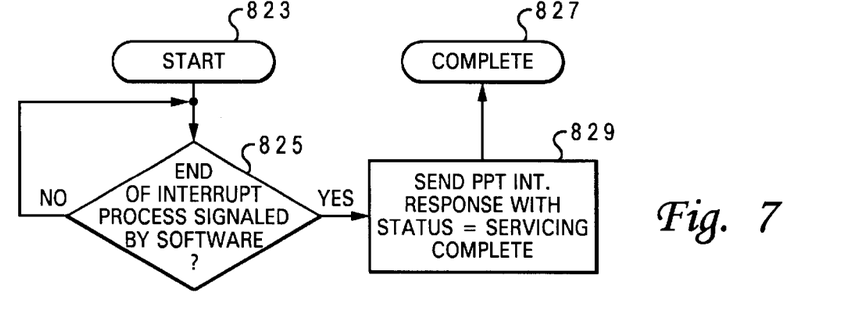
FIG. 7 is a flow chart illustrating a functional flow for a PPT response master processing the end of an interrupt operation.

Turning back to FIG. 2, the PPT response 221 and associated PPT data 227 is inputted to the PCI host bridge 105 and delivered the PCI device 127 through PCI bus 125. It should be understood for purposes of the present invention, that the PCI host bridge 123 can either be configured to transfer back and forth the PPT package format described above for both request master signals and response master signals or the interrupt controller 104 can be implemented as part of the PCI host bridge 123. The PCI device 127 receives the PPT response 316 data in its PPT response target 211 and associated PPT response data 318 in its PPT data buffers 215 for input into PCI device's 127 device logic 205 for processing. FIGS. 5, 6 and 7 detail the operation of performing read transfers in accordance with the present invention as described below.

Referring now to FIG. 5, there is shown a flow chart illustrating a function flow for a PPT request master 207 requesting an interrupt. Staring at 701, the PCI device 127 prepares an initial PPT request 300 by formatting a PPT source address 302, PPT response destination 304, IRQ server/source number 308 and priority 310, shown in step 703. Next, shown in step 705 the PPT request 300 is then sent to the interrupt controller 104, as described above, and a system timeout timer is started. The process proceeds to step 707 wherein the PCI device 127 checks to see if the interrupt controller returned a PPT response 314, if not the timer is checked for any timeouts, shown in step 709. If no timeouts have occur, the loop continues with the PCI polling for a returned response at step 707. However, if a timeout occurs the interrupt controller is too busy to service the interrupt, as will be more full described below, and the process starts all over again at step 703.

Referring once again to FIG. 5, if the response 314 received by the PCI device 127 is that the interrupt has been rejected, the device logic 205 decides if the service requested is urgent, shown in steps 711 and 713. If the service is not needed urgently, the PCI device waits a suggested time delay as indicated by the delay field 326 of the response data 318, step 715 and then starts over at step 703. However, if the service is urgently needed the device logic 205 immediately starts over and reissues the request 300. If the interrupt is not rejected then the process as shown in step 717 checks see if the interrupt controller 104 has accepted the request 300. If the interrupt is accepted, the process performs steps 719 and 721 wherein a response timer is started and the PCI device polls the timer for a response timeout. Before a response timeout has occurred, the PCI device waits to receive the PPT response to take the appropriate completion of reading the data, as shown in the loop of steps 721 and 723. If a PPT response is received the process loops back to step 711. If a timeout does occur before a response is delivered from the interrupt controller, the process as shown in step 725, logs an error in the device and sets up and error interrupt and returns to the start of the process 703.

Referring again to FIG. 5, if the interrupt response is not accepted in step 717, the process goes to step 727 to check if the status interrupt has been completed. If not an error is reported to the system as shown in step 735. If however, the status interrupt is completed, a pending interrupt bit is cleared for the specified interrupt and the PCI polls for any other interrupts pending, as shown in steps 729 and 731. If no interrupts are pending the system goes idle, as shown in step 733 or the PCI checks to see if another PPT response 314 has been returned at step 707.

Referring now to FIG. 6, there is depicted a flowchart illustrating a functional flow for a PPT request target 219 and interrupt controller 223 processing interrupts from a PPT request master 207. As shown in steps 801 and 803, the interrupt controller receives the interrupt request packet 300 from the PPT request master 207, as described above. The process then goes to step 805 wherein the interrupt control logic 223 checks to see if any interrupts are pending. If no interrupts are pending, the response master 221 sends to the PCI response target 211 that the status has been accepted, as shown in step 809. The interrupt controller 104 through its interrupt control logic next determines if the accepted priority has a greater processing priority for acceptance of processing to the appropriate CPU. If not, the process loops until the appropriate priority level is reached as shown in step 813. When the priority is appropriate, the request is sent to the CPU and the interrupt presentation process is complete.

Referring once again to FIG. 6, if there are interrupts pending at step 805, the interrupt controller 104 determines if the newly received interrupt is a higher priority at step 807. If the interrupt does not have high enough priority the response master 221 sends a PPT response 314 to the PCI device 127 that the interrupt has been rejected and the process completes, as shown in steps 819 and 821. If however in step 807, there is no higher interrupt priority, the process proceeds to step 811 wherein older interrupts are rejected and the new interrupted is accepted, shown in steps 811 and 815. This accomplished by the appropriate PPT response signal 314 being sent to the PPT response target 211. The process then continues at step 813 as described above.

Referring now to FIG. 7, there is depicted a flowchart illustrating a functional flow for a PPT response master 221 processing the end of an interrupt operation. As shown in steps 823 and 825, the interrupt control logic 223, continuously checks to see if the end of the interrupt process has been signaled by the software. When the response master 221, receives the software. When the response master 221, receives the appropriate signal, it sends a PPT response 314 indicating to the PCI device 127 that the requested servicing has been completed, as shown in steps 829 and 827.

The protocol developed by this invention allows the local interrupt controller 104 to bounce back interrupts to the I/O devices if its queues are full. This overcome the prior art methods of scalability. There is no per-interrupt resources necessary in the local interrupt controller 104, and therefore the resources in the local interrupt controller 104 piece do not need to grow linearly with the number of I/O devices that is to be supported. Additionally, in terms of data coherency, it can be appreciated that the above-described PPT packets that contain the interrupt information will not bypass the data that is written by the I/O device 127, and since the I/O device 127 originates both, with proper system design, the data will reach its destination without software having to execute a load to flush the data to its destination, giving better system performance.

Since the interrupt completions can originate from the local interrupt controller 104 and go all the way back to the I/O device, 127 the interrupt service code does not need to write to the device 127 to signal interrupt completion. Likewise, on interrupt generation, the I/O device 127 sends the information needed by the device driver to determine the reason for the device's interrupt to the controller and therefore the latency of polling the I/O device on interrupt is eliminated. Lastly, all transaction go across the same path as data, and therefore the mechanisms used to extend the I/O out away from the box, will also work for the interrupt controller.

The method and system of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for transferring a pipelined packet transfer (PPT) from an input/output device, said method comprising:
    sending a PPT request packet having a source address, response destination and information packet from an input/output device to an interrupt controller across a databus located between said input/output device and said interrupt controller;
    receiving a PPT response packet from said interrupt controller across said databus; and
    resending said PPT request packet across said databus from said input/output device if a PPT reject response packet is received from said interrupt controller before a PPT complete response packet.

2. A method according to claim 1, further comprising:
    receiving a PPT accept response packet prior to receiving said PPT complete response packet.

3. A method according to claim 1, said PPT reject response packet further comprising a value representing a suggested length of time for said input/output device to wait before resending said PPT request packet after receiving said PPT reject response packet.

4. A method according to claim 1, wherein said source address locates said interrupt controller, said response destination locates said input/output device and said information packet specifies a device driver to call to service an interrupt requested by said PPT request packet.

5. A method according to claim 1, wherein said input/output device and said interrupt controller communicate said PPT request packet and said PPT response packet without an intermediary processing.

6. A method according to claim 1, further comprising:
    said PPT complete response packet clearing an interrupt bit in said input/output device for a specified interrupt.

7. A method according to claim 1, further comprising:
    starting a response timer for initiating a response timeout upon receiving said accept status wherein said input/output device sets up an error interrupt if said PPT complete response packet is not received before said response timeout.

8. A method according to claim 1, further comprising:
    transmitting said PPT request packet to a remotely located interrupt controller on a network.

9. A method according to claim 3 further comprising:
    waiting said suggested length of time before resending said PPT request packet from said input/output device after receiving said PPT reject response packet.

10. An information processing system comprising:
    means for sending a PPT request packet having a source address, response destination and information packet from an input/output device to an interrupt controller across a databus located between said input/output device and said interrupt controller;
    means for receiving a PPT response packet from said interrupt controller across said databus; and
    means for resending said PPT request packet across said databus from said input/output device if a PPT reject response packet is received from said interrupt controller before a PPT complete response packet.

11. An information processing system according to claim 10, further comprising:
    means for receiving a PPT accept response packet prior to receiving said PPT complete response packet.

12. An information processing system according to claim 10, wherein said PPT reject response packet further comprises a value representing a suggested length of time for said input/output device to wait before resending said PPT request packet after receiving said PPT reject response packet.

13. An information processing system according to claim 10, wherein said source address locates said interrupt controller, said response destination locates said input/output device and said information packet specifies a device driver to call to service an interrupt requested by said PPT request packet.

14. An information processing system according to claim 1, wherein said input/output device and said interrupt controller communicate said PPT request packet and said PPT response packet without an intermediary processing.

15. An information processing system according to claim 10, further comprising:
   means for said PPT complete response packet clearing an interrupt bit in said input/output device for a specified interrupt.

16. An information processing system according to claim 10, further comprising:
   means for starting a response timer for initiating a response timeout upon receiving said accept status wherein said input/output device sets up an error interrupt if said PPT complete response packet is not received before said response timeout.

17. An information processing system according to claim 10, further comprising:
   means for transmitting said PPT request packet to a remotely located interrupt controller on a network.

18. An information processing system according to claim 12, further comprising:
   means for resending said PPT from said input/output device after waiting said suggested length of time.

19. The method of claim 1, wherein said PPT reject response packet is received after said PPT accept response packet due to a higher priority interrupt packet displacing said PPT request packet from a queue in said interrupt controller.

20. The information processing system according to claim 11, wherein said PPT reject response packet is received after said PPT accept response packet due to a higher priority interrupt packet displacing said PPT request packet from a queue in said interrupt controller.

* * * * *

UNITED STATES PATENT AND TRADEMARK OFFICE
CERTIFICATE OF CORRECTION

PATENT NO.    : 6,493,779 B1
DATED         : December 10, 2002
INVENTOR(S)   : Guthrie et al.

It is certified that error appears in the above-identified patent and that said Letters Patent is hereby corrected as shown below:

Column 1,
Lines 60-61, please insert -- than -- between "faster" and "the".

Column 2,
Line 46, please insert -- accordance -- between "in" and "with".

Signed and Sealed this

Tenth Day of June, 2003

JAMES E. ROGAN
*Director of the United States Patent and Trademark Office*